(12) United States Patent
Hitchcock et al.

(10) Patent No.: US 12,348,065 B2
(45) Date of Patent: Jul. 1, 2025

(54) CHARGING INLET ASSEMBLY HAVING A HUMAN MACHINE INTERFACE (HMI) ASSEMBLY

(71) Applicant: TE CONNECTIVITY SOLUTIONS GMBH, Schaffhausen (CH)

(72) Inventors: Matthew Bryan Hitchcock, Hershey, PA (US); Hurley Chester Moll, Hershey, PA (US); Aaron James de Chazal, Rochester, MI (US); Kevin John Peterson, Kernersville, NC (US); Clara Marguerite Rhodes, Winston Salem, NC (US)

(*) Notice: Subject to any disclaimer, the term of this patent is extended or adjusted under 35 U.S.C. 154(b) by 339 days.

(21) Appl. No.: 17/883,721

(22) Filed: Aug. 9, 2022

(65) Prior Publication Data

US 2023/0058392 A1   Feb. 23, 2023

Related U.S. Application Data

(60) Provisional application No. 63/234,667, filed on Aug. 18, 2021.

(51) Int. Cl.
| | |
|---|---|
| *B60L 53/16* | (2019.01) |
| *G06F 1/18* | (2006.01) |
| *G07C 5/08* | (2006.01) |
| *H01R 13/639* | (2006.01) |
| *H01R 27/02* | (2006.01) |
| *H02J 7/00* | (2006.01) |

(52) U.S. Cl.
CPC ............ *H02J 7/0045* (2013.01); *B60L 53/16* (2019.02); *G06F 1/189* (2013.01); *G07C 5/0825* (2013.01); *H01R 13/639* (2013.01); *H01R 27/02* (2013.01); *H02J 7/0047* (2013.01); *H01R 2201/26* (2013.01)

(58) Field of Classification Search
CPC ....... B60L 53/16; H01R 13/639; H01R 27/02; H01R 2201/26; H02J 7/0045; H02J 7/0047
See application file for complete search history.

(56) References Cited

U.S. PATENT DOCUMENTS

| | | | |
|---|---|---|---|
| 8,753,136 B2* | 6/2014 | Hirashita | B60L 53/16 439/304 |
| 9,597,967 B2* | 3/2017 | DeBoer | B60L 53/305 |
| 2019/0389321 A1* | 12/2019 | Spincich | B60L 53/16 |
| 2023/0054502 A1* | 2/2023 | Hitchcock | H01R 13/6616 |
| 2023/0057953 A1* | 2/2023 | Rhodes | B60L 53/16 |
| 2023/0059653 A1* | 2/2023 | Hitchcock | B60L 53/16 |

(Continued)

*Primary Examiner* — Vanessa Girard (57) ABSTRACT

A charging inlet assembly includes a housing extending between a front and a rear. The housing has a DC section includes DC terminal channels configured to receive DC terminals. The housing has an AC section including AC terminal channels configured to receive AC terminals. The DC section configured for mating with a DC charging connector at the front. The AC section configured for mating with an AC charging connector at the front. The housing includes an indicator opening. The charging inlet assembly includes a human machine interface (HMI) assembly coupled to the rear of the housing. The HMI assembly includes a charging indicator aligned with the indicator opening. The charging indicator is visible from the front of the housing to indicate a charging status of the charging inlet assembly.

20 Claims, 5 Drawing Sheets

(56) References Cited

U.S. PATENT DOCUMENTS

| | | | |
|---|---|---|---|
| 2023/0116836 A1* | 4/2023 | Rhodes | B60L 53/16 |
| | | | 320/109 |
| 2023/0246405 A1* | 8/2023 | Hitchcock | H02J 7/0042 |
| | | | 439/655 |
| 2024/0195105 A1* | 6/2024 | Hitchcock | H01R 13/641 |

\* cited by examiner

CHARGING INLET ASSEMBLY HAVING A HUMAN MACHINE INTERFACE (HMI) ASSEMBLY

CROSS REFERENCE TO RELATED APPLICATIONS

This application claims priority to U.S. Provisional Application No. 63/234,667, filed 18 Aug. 2021, the subject matter of which is herein incorporated by reference in its entirety.

BACKGROUND OF THE INVENTION

The subject matter herein relates generally to charging inlet assemblies.

Charging inlet assemblies are used to charge vehicles, such as for charging a battery system of an electric vehicle (EV) or hybrid electric vehicle (HEV). The charging inlet assembly includes power connectors for connecting to a charging connector. Conventional charging inlet assemblies include AC terminals and DC terminals. The AC terminals and the DC terminals are housed within an inlet housing, which interfaces with the charging connector. The inlet housing is coupled to the vehicle. Some charging systems for vehicles include a charging indicator to indicate a charge status of the charging system. The charging indicator is typically mounted to the vehicle proximate to the charging inlet assembly. Current designs utilize multiple components that are assembled together on the vehicle, which increases the assembly time and cost and leads to assembly error.

A need remains for an improved charging inlet assembly.

BRIEF DESCRIPTION OF THE INVENTION

In one embodiment, a charging inlet assembly is provided and includes a housing extending between a front and a rear. The housing has a DC section includes DC terminal channels configured to receive DC terminals. The housing has an AC section including AC terminal channels configured to receive AC terminals. The DC section configured for mating with a DC charging connector at the front. The AC section configured for mating with an AC charging connector at the front. The housing includes an indicator opening. The charging inlet assembly includes a human machine interface (HMI) assembly coupled to the rear of the housing. The HMI assembly includes a charging indicator aligned with the indicator opening. The charging indicator is visible from the front of the housing to indicate a charging status of the charging inlet assembly.

In another embodiment, a charging inlet assembly is provided and includes a housing extending between a front and a rear. The housing has a panel at the front. The housing has a rear cavity at the rear. The housing has a DC section includes DC terminal channels configured to receive DC terminals. The housing has an AC section includes AC terminal channels configured to receive AC terminals. The DC section configured for mating with a DC charging connector at the front. The AC section configured for mating with an AC charging connector at the front. The panel includes an indicator opening forward of the rear cavity. The charging inlet assembly includes a human machine interface (HMI) assembly coupled to the housing. The HMI assembly includes an interface housing has a chamber and an interface controller received in the chamber. The interface housing coupled to the housing at the rear cavity. The interface controller includes a control circuit board and an indicator light coupled to the control circuit board. The interface controller received in the rear cavity with the indicator light aligned with the indicator opening. The indicator light is visible from the front of the housing to indicate a charging status of the charging inlet assembly.

In a further embodiment, a charging inlet assembly is provided and includes a housing extending between a front and a rear. The housing has a DC section including DC terminal channels. The housing has an AC section includes AC terminal channels. The DC section configured for mating with a DC charging connector at the front. The AC section configured for mating with an AC charging connector at the front. The housing includes an indicator opening. The charging inlet assembly includes DC terminals received in the corresponding DC terminal channels for mating with the DC charging connector. The charging inlet assembly includes AC terminals received in the corresponding AC terminal channels for mating with the AC charging connector. The charging inlet assembly includes a human machine interface (HMI) assembly coupled to the rear of the housing. The HMI assembly includes a charging indicator aligned with the indicator opening. The charging indicator is visible from the front of the housing to indicate a charging status of the charging inlet assembly.

DETAILED DESCRIPTION OF THE INVENTION

Figure 1:
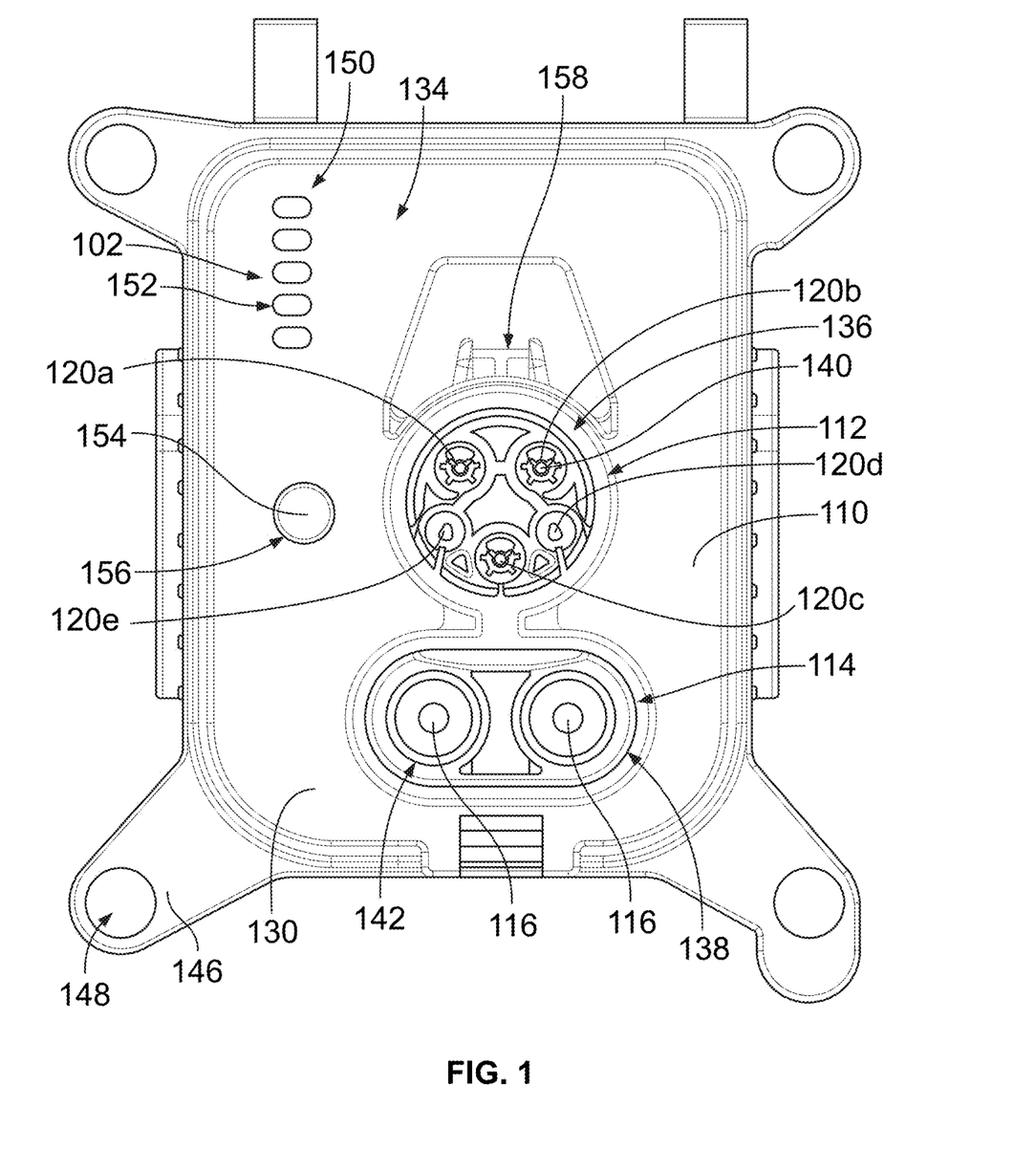
FIG. 1 is a front view of a charging inlet assembly including a human machine interface (HMI) assembly in accordance with an exemplary embodiment.
Figure 2:
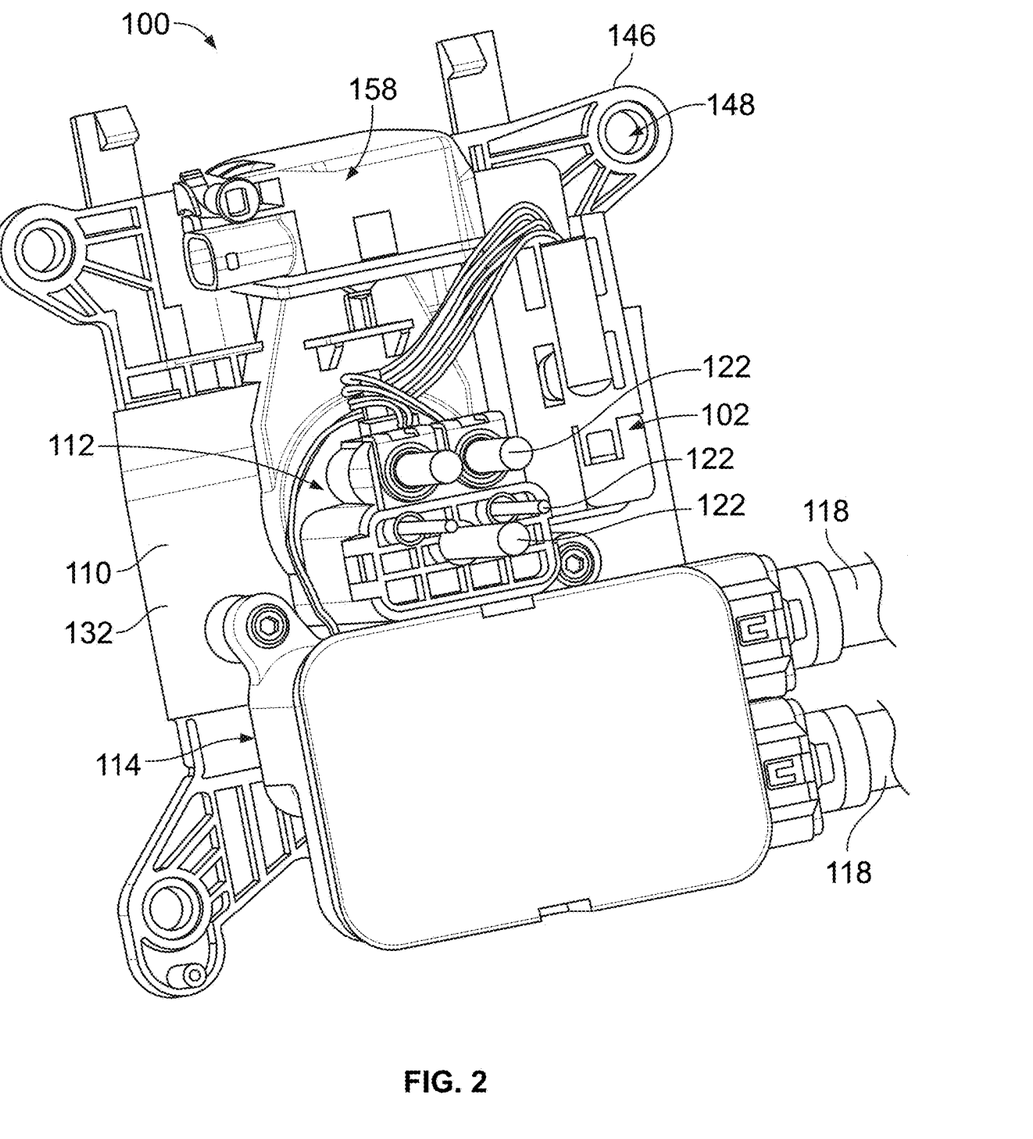
FIG. 2 is a rear perspective view of the charging inlet assembly showing the HMI assembly in accordance with an exemplary embodiment.

FIG. 1 is a front view of a charging inlet assembly 100 including a human machine interface (HMI) assembly 102 in accordance with an exemplary embodiment. FIG. 2 is a rear perspective view of the charging inlet assembly 100 showing the HMI assembly 102 in accordance with an exemplary embodiment. The charging inlet assembly 100 is used as a charging inlet for a vehicle, such as an electric vehicle (EV) or hybrid electric vehicle (HEV). The HMI assembly 102 is integrated with the other components of the charging inlet assembly 100. For example, the HMI assembly 102 is coupled to the vehicle as part of the charging inlet assembly 100 (as a unit) in a single assembly step. The HIM assembly is not separately mounted to the vehicle from the other components of the charging inlet assembly 100.

The charging inlet assembly 100 is configured for mating reception with a charging connector (not shown). In an exemplary embodiment, the charging inlet assembly 100 is configured for mating with various types of charging connectors, such as a DC fast charging connector (for example, the SAE combo CCS charging connector) in addition to AC charging connectors (for example, the SAE J1772 charging connector).

The charging inlet assembly 100 includes a housing 110 configured to be mounted in the vehicle. The housing 110 holds the HMI assembly 102. In various embodiments, the HMI assembly 102 is removable from the housing 110, such as for repair or replacement of the HMI assembly 102. For example, the HMI assembly 102 may be latchably coupled to the housing 110.

In an exemplary embodiment, the housing 110 includes an AC section 112 that receives the AC charging connector or an AC section of the charging connector and a DC section 114 that receives the DC charging connector or a DC section of the charging connector. In the illustrated embodiment, the AC section 112 is located above the DC section 114; however, other orientations may be possible in alternative embodiments.

The charging inlet assembly 100 includes DC terminals 116 at the DC section 114. The DC terminals 116 are held by the housing 110. In various embodiments, the DC terminals 116 may be part of a DC module that is coupled to the housing 110. In the illustrated embodiment, two DC terminals 116 are provided. In an exemplary embodiment, the DC terminals 116 includes pins at mating ends of the DC terminals 116. DC cables 118 are terminated to the DC terminals 116 and extend from the charging inlet assembly 100 to another component of the vehicle, such as the battery system of the vehicle. The DC terminals 116 are configured to be mated to the charging connector.

In an exemplary embodiment, the DC section 114 of the charging inlet assembly 100 defines a high-voltage connector configured to be coupled to the high-voltage portion of the charging connector. The high-voltage connector (for example, the DC terminals 116 and the DC cables 118) is configured to be coupled to other components in the system, such as the battery and/or the battery distribution unit of the vehicle. The high-voltage connector is used for fast charging of the battery. The high-voltage connector may be socket connector configured to receive the charging plug. Seals may be provided at the interface of the high-voltage connector.

The charging inlet assembly 100 includes AC terminals 120 at the AC section 112. The AC terminals 120 are held by the housing 110. In various embodiments, the AC terminals 120 may be part of an AC module that is coupled to the housing 110. In the illustrated embodiment, five AC terminals 120 are provided, including a first AC charging terminal 120a, a second AC charging terminal 120b, a ground terminal 120c, a proximity terminal 120d, and a pilot terminal 120e. Optionally, the AC terminals 120 may be different sized terminals. In an exemplary embodiment, the AC terminals 120 includes pins at mating ends of the AC terminals 120. AC cables 122 are terminated to the AC terminals 120 and extend from the charging inlet assembly 100 to another component of the vehicle, such as the battery system of the vehicle. Optionally, one or more of the AC cables 122 may be connected to the HMI assembly 102. The AC terminals 120 are configured to be mated to the charging connector.

In an exemplary embodiment, the AC section 112 of the charging inlet assembly 100 defines a low-voltage connector configured to be coupled to the low-voltage portion of the charging connectors. The low-voltage connector (for example, the AC terminals 120 and the AC cables 122) is configured to be coupled to other components in the system, such as a battery distribution unit, to control charging of the vehicle. The low-voltage connector may transmit/receive signals relating to charging, such as status of connection, status of charge, voltage of charge, and the like. The low-voltage connector may be socket connector configured to receive the charging plug. Seals may be provided at the interface of the low-voltage connector.

The housing 110 includes a front 130 and a rear 132. The front 130 of the housing 110 faces outward and is presented to the operator to connect the charging connector. The rear 132 faces the interior of the vehicle and is generally inaccessible without removing the housing 110 from the vehicle. In an exemplary embodiment, the housing 110 includes a panel 134 at the front 130. In an exemplary embodiment, an AC socket 136 is formed in the panel 134 at the AC section 112 and a DC socket 138 is formed in the panel 134 at the DC section 114. The AC socket 136 includes AC terminal channels 140 that receive the AC terminals 120. During charging, the AC charging connector is plugged into the AC socket 136 to electrically connect to the AC terminals 120. The DC socket 138 includes DC terminal channels 142 that receive the DC terminals 116. The DC charging connector is configured to be plugged into the DC socket 138. During charging, the DC charging connector is plugged into the DC socket 138 to electrically connect to the DC terminals 116. The panel 134 may surround the AC socket 136 and the DC socket 138 at the front 130.

In an exemplary embodiment, the housing 110 includes mounting tabs 146 used for mounting the housing 110 to the vehicle. The mounting tabs 146 having openings 148 that receive fasteners (not shown) to secure the charging inlet assembly 100 to the vehicle. Other types of mounting features may be used to secure the charging inlet assembly 100 to the vehicle. In various embodiments, the charging inlet assembly 100 may include a mounting flange coupled to the front of the housing 110 for mounting the charging inlet assembly 100 to the vehicle. The housing 110 and/or the mounting flange may include a seal (not shown) to seal the charging inlet assembly 100 to the vehicle. In various embodiments, the charging inlet assembly 100 may include a terminal cover (not shown) at the front of the housing 110 to cover portions of the housing 110, such as the DC section 114 and/or the AC section 112. The housing 110 may include one or more rear covers at the rear of the housing 110 to close access to the rear of the housing 110. The cover(s) may be clipped or latched onto the main part of the housing 110, such as using clips or latches. Other types of securing features, such as fasteners may be used in alternative embodiments.

In an exemplary embodiment, the housing 110 includes an HMI area 150 at the front 130. The HMI assembly 102 is coupled to the housing 110 at the HMI area 150. The HMI area 150 is visible at the front 130 for interaction by the operator. In an exemplary embodiment, the housing 110 includes indicator openings 152 at the front 130. The indicator openings 152 pass through the panel 134. The HMI assembly 102 includes indicator lights at the indicator openings 152 that are visible from the front 130 of the housing 110, such as to indicate a charging status of the charging inlet assembly 100. In an exemplary embodiment, the HMI assembly 102 includes an actuator unlock button 154 at the front 130. The housing 110 including an opening 156 that receives the actuator unlock button 154. The actuator unlock button 154 is used for unlocking a latching actuator 158, which is used for latchably securing the charging connector to the housing 110.

Figure 3:
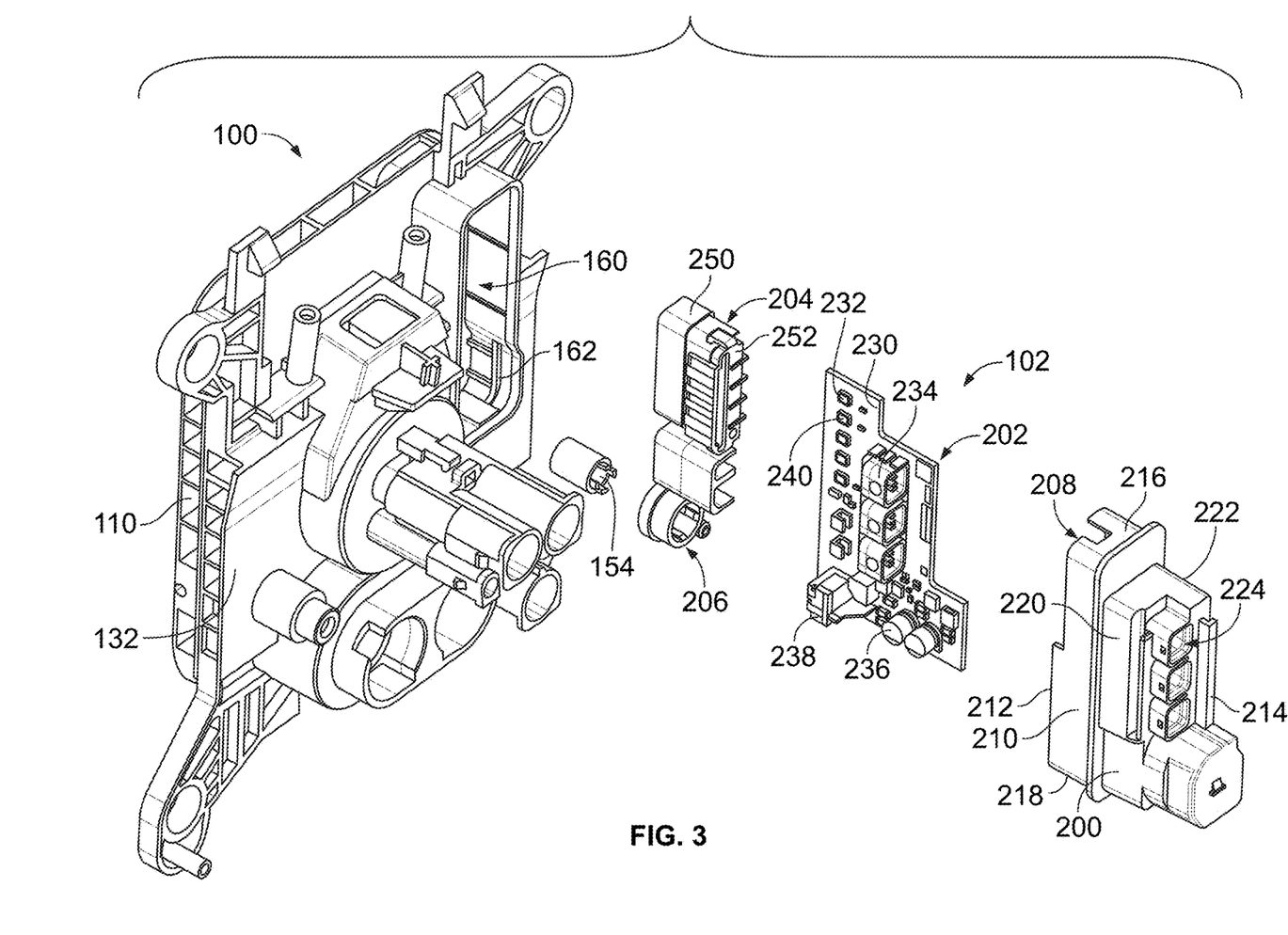
FIG. 3 is a rear perspective, exploded view of the charging inlet assembly showing the HMI assembly in accordance with an exemplary embodiment.
Figure 4:
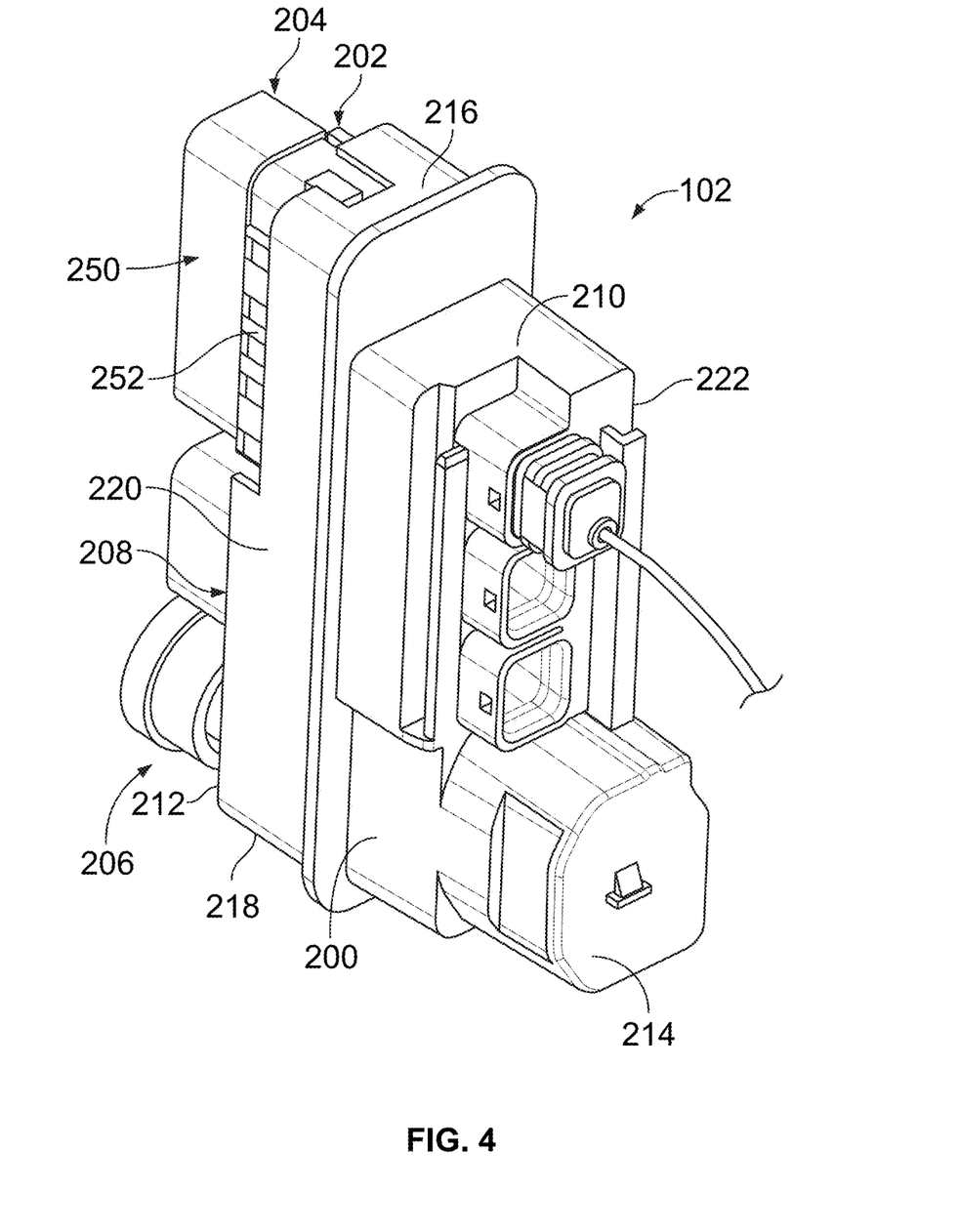
FIG. 4 is a rear perspective, assembled view of the HMI assembly in accordance with an exemplary embodiment.

FIG. 3 is a rear perspective, exploded view of the charging inlet assembly 100 showing the HMI assembly 102 in accordance with an exemplary embodiment. FIG. 4 is a rear perspective, assembled view of the HMI assembly 102 in accordance with an exemplary embodiment. In FIG. 3, the HMI assembly 102 is exploded to show components thereof.

The HMI assembly 102 includes an interface housing 200, an interface controller 202, a lens assembly 204, and an actuator unlock assembly 206. The interface housing 200 holds the interface controller 202, the lens assembly 204, and the actuator unlock assembly 206. In an exemplary embodiment, the interface housing 200 includes a chamber 208 that receives the interface controller 202, the lens assembly 204, and the actuator unlock assembly 206. The interface housing 200 is configured to be coupled to the housing 110, such as at the rear 132 of the housing 110. The interface housing 200 positions the interface controller 202, the lens assembly 204, and the actuator unlock assembly 206 relative to the housing 110 when coupled thereto.

In an exemplary embodiment, the housing 110 includes a rear cavity 160 at the rear 132. The rear cavity 160 receives the HMI assembly 102. The rear cavity 160 is located rearward of the panel 134. The rear cavity 160 is located within the envelope (for example, outer periphery, such as side-to-side and top-to-bottom) of the housing 110. In the illustrated embodiment, the rear cavity 160 is open at the rear to receive the HMI assembly 102 through the opening at the rear. In an exemplary embodiment, the housing 110 includes a housing securing element 162. The housing securing element 162 is used to secure the HMI assembly 102 in the rear cavity 160. In various embodiments, the housing securing element 162 is a latching element, such as a deflectable latch, a latch catch, or other type of latching element . Other types of securing elements may be used in alternative embodiments, such as threaded fasteners, clips or other securing elements.

The interface housing 200 includes walls 210 defining the chamber 208. The interface housing 200 extends between a front 212 and a rear 214. The interface housing 200 includes a top 216 and a bottom 218. The interface housing 200 includes sides 220, 222 between the front 212 and the rear 214 and between the top 216 and the bottom 218. The interface housing 200 includes receptacles 224 at the rear 214. The receptacles 224 may receive contacts, connectors, wires or other electrical components configured to be electrically connected to the interface controller 202.

In an exemplary embodiment, the interface controller 202 includes a control circuit board 230, one or more charging indicators 232 coupled to the control circuit board 230, one or more connectors 234 coupled to the control circuit board 230, circuit components 236 coupled to the control circuit board 230, and an actuator controller 238 coupled to the control circuit board 230. The connectors 234 are configured to be connected to other components, such as corresponding AC terminals or the vehicle control system to control functions of the HMI assembly 102. Each connector 234 may include a connector housing and a contact held by the connector housing and mounted to the control circuit board 230. Control signals may be received by the connectors 234 to control operation of the HMI assembly 102, such as to control the charging indicators 232. The connectors 234 are aligned with the receptacles 224, such as for mating with mating connectors or wires extending to other components of the charging inlet assembly 100. The circuit components 236 may include capacitors, resistors, processors, LED drivers, or other types of circuit components used for controlling operation of the interface controller 202. The actuator controller 238 is aligned with the actuator unlock button 154 and configured to be operably coupled to the actuator controller 238. For example, when the actuator controller 238 is pressed, the actuator controller 238 is operated, such as to unlock the latching actuator 158.

In an exemplary embodiment, the charging indicators 232 include LEDs 240. The LEDs 240 are activated to provide visual indication of a charging status of the charging inlet assembly 100. For example, one or more of the LEDs 240 may be activated to indicate if charging is occurring (ON/OFF). One or more of the LEDs 240 may be activated to indicate if charging is delayed. One or more of the LEDs 240 may be activated to indicate the charge level (for example, low charge, medium charge, full charge, and the like).

The lens assembly 204 includes a lens holder 250 holding one or more lenses 252. The lenses 252 are configured to be aligned with the LEDs 240 to receive light from the LEDs 240. The lens assembly 204 is received in the rear cavity 160. In various embodiments, the lens assembly 204 may be coupled to the control circuit board 230 and loaded into the rear cavity 160 with the control circuit board 230. The lenses 252 are configured to be aligned with corresponding indicator openings 152 to direct the light from the LEDs 240 to the indicator openings 152.

During assembly, the lens assembly 204 is loaded into the rear cavity 160, such as through the rear of the housing 110. The lens assembly 204 may be positioned relative to the housing 110 using locating features, such as datum surfaces, guide surfaces, or other types of locating features. The lens holder 250 may be held in the rear cavity 160 by an interference fit. During assembly, the interface controller 202 is loaded into the rear cavity 160. The interface controller 202 is positioned in the rear cavity 160 such that the LEDs 240 are aligned with the lenses 252 of the lens assembly 204. During assembly, the interface housing 200 is coupled to the housing 110 to cover the interface controller 202. A portion of the interface housing 200 may be loaded into the rear cavity 160. In alternative embodiments, the lens assembly 204 and/or the interface controller 202 may be loaded into the interface housing 200 prior to coupling to the housing 110. Once assembled, the interface housing 200 protects the interface controller 202 and the lens assembly 204 and/or retains the interface controller 202 and the lens assembly 204 in the rear cavity 160. Once assembled, the HMI assembly 102 is fixed to the housing 110 and is secured to the vehicle with the housing 110.

Figure 5:
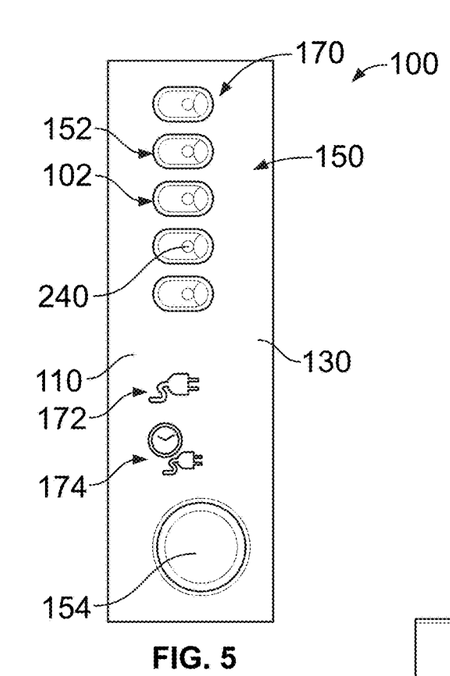
FIG. 5 is a front view of a portion of the charging inlet assembly showing the HMI assembly at the front of the housing in accordance with an exemplary embodiment.

FIG. 5 is a front view of a portion of the charging inlet assembly 100 showing the HMI assembly 102 at the front 130 of the housing 110 in accordance with an exemplary embodiment. In the illustrated embodiment, the HMI area 150 includes a charging level indicator 170, an active charging indicator 172, and a delayed charging indicator 174. The HMI area 150 may have other types of charging indicators that indicate charging status of the charging inlet assembly 100. The actuator unlock button 154 is located proximate to the charging indicators 152. In the illustrated embodiment, the charging level indicator 170 is located above the active charging indicator 172 the delayed charging indicator 174 on the left side of the AC section 112. The actuator unlock button 154 is located below the charging indicators. Other locations are possible in alternative embodiments.

In an exemplary embodiment, the charging level indicator 170 includes a plurality of LEDs 240 aligned with corresponding indicator openings 152. In the illustrated embodiment, the charging level indicator 170 includes five (5) of the LEDs 240 and indicator openings 152. In various embodiments, the lowest LED 240 is illuminated when the battery has a low charge level. Additional LEDs 240 are successively illuminated as the charge level increases. All five LEDs 240 are illuminated when the battery is fully charged. Other lighting schemes may be used in alternative embodiments to indicate the charge level.

In an exemplary embodiment, the active charging indicator 172 is illuminated when the battery is being actively charged. The delayed charging indicator 174 is illuminated when the charging is delayed. For example, when the charging terminals are above a predetermined temperature, the charging process may be delayed to allow the charging terminals to cool.

Figure 6:
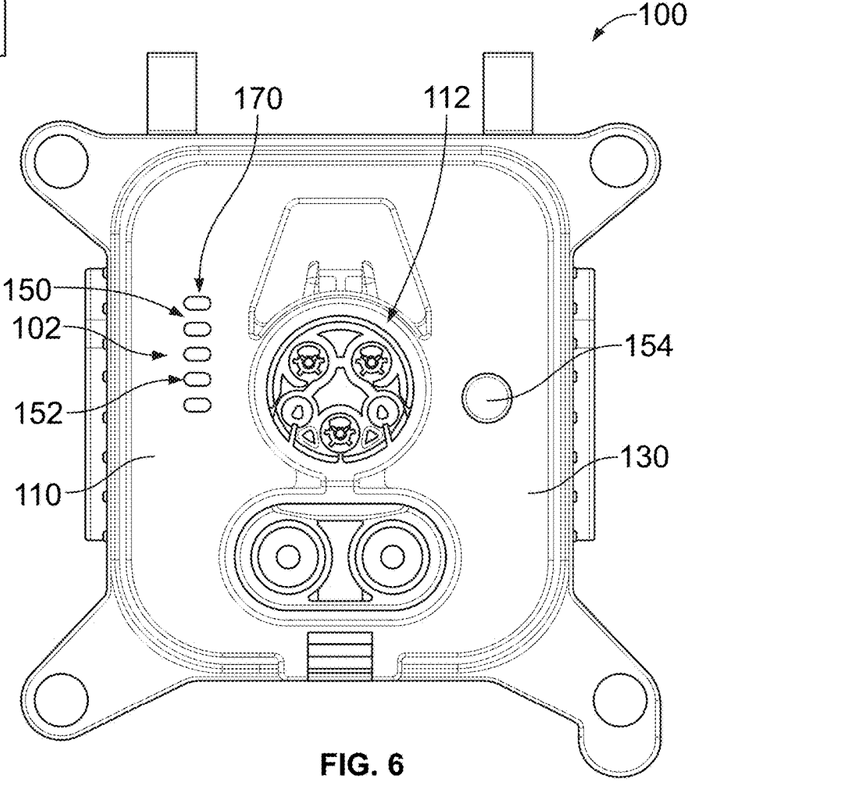
FIG. 6 is a front view of a portion of the charging inlet assembly showing the HMI assembly at the front of the housing in accordance with an exemplary embodiment.

FIG. 6 is a front view of a portion of the charging inlet assembly 100 showing the HMI assembly 102 at the front 130 of the housing 110 in accordance with an exemplary embodiment. In the illustrated embodiment, the HMI area 150 includes the charging level indicator 170 and the actuator unlock button 154 is located proximate to the charging indicators 152. In the illustrated embodiment, the charging level indicator 170 and the actuator unlock button 154 are located on opposite sides of the AC section 112. Other locations are possible in alternative embodiments.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A charging inlet assembly comprising:
a housing extending between a front and a rear, the housing having a DC section including DC terminal channels configured to receive DC terminals, the housing having an AC section including AC terminal channels configured to receive AC terminals, the DC section configured for mating with a DC charging connector at the front, the AC section configured for mating with an AC charging connector at the front, the housing including a panel at the front having an indicator opening; and
a human machine interface (HMI) assembly coupled to the rear of the housing and located behind the panel, the HMI assembly including a charging indicator aligned with the indicator opening, the charging indicator being visible from the front of the housing to indicate a charging status of the charging inlet assembly.

2. The charging inlet assembly of claim 1, wherein the HMI assembly is located rearward of the housing.

3. The charging inlet assembly of claim 1, wherein the housing includes a rear cavity at the rear, the HMI assembly being received in the rear cavity.

4. The charging inlet assembly of claim 1, wherein the HMI assembly is coupled to a rear of the panel.

5. The charging inlet assembly of claim 1, wherein the charging indicator includes an indicator light.

6. The charging inlet assembly of claim 1, wherein the indicator opening is a first indicator opening, the housing including a second indicator opening, the charging indicator including a first indicator light aligned with the first indicator opening and a second indicator light aligned with the second indicator opening.

7. The charging inlet assembly of claim 1, wherein the housing includes a housing latching element, the HMI assembly including an assembly latching element latchably coupled to the housing latching element to secure the HMI assembly to the housing.

8. The charging inlet assembly of claim 1, wherein the HMI assembly is coupled to the housing prior to the housing being coupled to a vehicle, the housing positioning the HMI assembly relative to the vehicle.

9. The charging inlet assembly of claim 1, wherein the HMI assembly includes an actuator unlock button, the housing including an opening receiving the actuator unlock button, the charging inlet assembly further comprising a charging connector latching actuator configured to latchably secure a charging connector to the housing, the HMI assembly being operably coupled to the charging connector latching actuator to control unlatching of the charging connector latching actuator when the actuator unlock button is actuated.

10. The charging inlet assembly of claim 1, wherein the HMI assembly includes an interface housing having a chamber and an interface controller received in the chamber, the interface housing being coupled to the rear of the housing, the charging indicator being coupled to the interface controller.

11. The charging inlet assembly of claim 10, wherein the interface controller includes a control circuit board, a connector coupled to the control circuit board, and a wire extending from the connector, the wire extending from the interface housing to the corresponding DC terminal.

12. The charging inlet assembly of claim 10, wherein the HMI assembly includes a lens assembly received in the rear cavity and aligned with the indicator opening, the lens assembly being aligned with the indicator light to receive light from the indicator light.

13. A charging inlet assembly comprising:
a housing extending between a front and a rear, the housing having a panel at the front, the housing having walls forming a rear cavity at the rear, the housing having a DC section including DC terminal channels configured to receive DC terminals, the housing having an AC section including AC terminal channels configured to receive AC terminals, the DC section configured for mating with a DC charging connector at the front, the AC section configured for mating with an AC charging connector at the front, the panel including an indicator opening forward of the rear cavity; and
a human machine interface (HMI) assembly coupled to the housing and located behind the panel, the HMI assembly including an interface housing having a chamber and an interface controller received in the chamber, the interface housing coupled to the housing at the rear cavity, the interface controller including a control circuit board and an indicator light coupled to the control circuit board, the interface controller received in the rear cavity with the indicator light aligned with the indicator opening, the indicator light being visible from the front of the housing to indicate a charging status of the charging inlet assembly.

14. The charging inlet assembly of claim 13, wherein the HMI assembly includes a connector coupled to the control circuit board and a wire extending from the connector, the wire extending from the interface housing to the corresponding DC terminal.

15. The charging inlet assembly of claim 13, wherein the HMI assembly includes a lens assembly received in the rear cavity and aligned with the indicator opening, the lens assembly being aligned with the indicator light to receive light from the indicator light.

16. The charging inlet assembly of claim 13, wherein the HMI assembly includes an actuator unlock button, the housing including an opening receiving the actuator unlock button, the charging inlet assembly further comprising a charging connector latching actuator configured to latchably secure a charging connector to the housing, the HMI assembly being operably coupled to the charging connector latching actuator to control unlatching of the charging connector latching actuator when the actuator unlock button is actuated.

17. The charging inlet assembly of claim 13, wherein the HMI assembly is located behind the panel.

18. A charging inlet assembly comprising:
a housing extending between a front and a rear, the housing having a DC section including DC terminal channels, the housing having an AC section including AC terminal channels, the DC section configured for mating with a DC charging connector at the front, the AC section configured for mating with an AC charging connector at the front, the housing including a panel at the front having an indicator opening;
DC terminals received in the corresponding DC terminal channels for mating with the DC charging connector;
AC terminals received in the corresponding AC terminal channels for mating with the AC charging connector; and
a human machine interface (HMI) assembly coupled to the rear of the housing and located behind the panel, the HMI assembly including a charging indicator aligned with the indicator opening, the charging indicator being visible from the front of the housing to indicate a charging status of the charging inlet assembly.

19. The charging inlet assembly of claim 18, wherein the HMI assembly is located rearward of the panel of the housing.

20. The charging inlet assembly of claim 18, wherein the HMI assembly includes an interface housing having a chamber and an interface controller received in the chamber, the interface housing being coupled to the rear of the housing, the charging indicator being coupled to the interface controller.

* * * * *